US006078289A

United States Patent [19]

Manoogian et al.

[11] Patent Number: 6,078,289

[45] Date of Patent: *Jun. 20, 2000

[54] ARRAY ANTENNA HAVING A DUAL FIELD OF VIEW

[75] Inventors: David V. Manoogian, Lynnfield; Kai-Chiang Chang, Northborough; Fritz Steudel, Sudbury, all of Mass.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/086,820

[22] Filed: May 29, 1998

[51] Int. Cl.[7] .............................. H04B 7/185; G01S 5/02

[52] U.S. Cl. ............................................ 342/373; 342/374

[58] Field of Search .................................... 342/373, 374, 342/79, 155, 434

[56] References Cited

U.S. PATENT DOCUMENTS

| | | | |
|---|---|---|---|
| 4,257,050 | 3/1981 | Ploussios . | |
| 4,963,890 | 10/1990 | Perrotta et al. | 342/359 |
| 5,038,147 | 8/1991 | Cerro et al. | 342/368 |
| 5,041,835 | 8/1991 | Matsumoto | 342/374 |
| 5,276,452 | 1/1994 | Schuss et al. | 342/371 |
| 5,734,345 | 3/1998 | Chen et al. | 342/74 |

OTHER PUBLICATIONS

TCOM L.P, Brochure entitled "71M™ AEROSTAT—Unsurpassed Capability and Economy of Operation", 9 pages.

*Primary Examiner*—Theodore M. Blum
*Attorney, Agent, or Firm*—Daly, Crowley & Mofford, LLP

[57] ABSTRACT

An array antenna includes two different types of super elements each having transmit/receive (TR) modules coupled thereto. The TR modules are widely spaced and the super elements are arranged such that by selectively activating certain ones of the super elements the antenna provides a dual field of view in elevation. A Narrow Field of View (NFOV) is achieved by activating all super elements in the antenna aperture. A Wide Field of View (WFOV) utilizes only super elements which are arranged in a center portion of the antenna aperture.

19 Claims, 6 Drawing Sheets

ARRAY ANTENNA HAVING A DUAL FIELD OF VIEW

CROSS-REFERENCE TO RELATED APPLICATIONS

Not applicable.

STATEMENTS REGARDING FEDERALLY SPONSORED RESEARCH

Not applicable.

BACKGROUND OF THE INVENTION

As is known in the art, there has been an increase in the number of countries which control and have access to missiles and missile technology such as cruise missiles and the technology associated therewith. Consequently, systems to detect, track and intercept such missiles have become of increasing importance.

One approach used to defend against cruise and other types of missiles involves deployment of existing Surface-to-Air Missile (SAM) systems. One problem with this approach, however, is that the number of SAM systems required to provide protection is related to the amount of area which must be covered as determined by the horizon limit of ground based sensors. Consequently, a relatively large number SAM systems must be deployed to provide an adequate defense. Thus, it is relatively expensive and in some cases cost prohibitive to use this approach.

Another problem with the ground based sensor approach is that it is relatively difficult for ground based sensors to detect missiles and other objects traveling at low altitudes. Furthermore, the topography of the terrain (e.g. mountains, etc . . . ) surrounding the geographic location of the ground based sensor can mask portions of the horizon from the ground based sensor. Since incoming cruise missiles typically travel at relatively low altitudes, it is difficult for ground based sensors to provide early warning of incoming cruise missiles.

Yet another approach to defend against missile attacks is referred to as air directed surface-to-air missile (ADSAM) defense. In this approach, sensors elevated on stationary platforms at a height generally in the range of about 15,000 to 20,000 feet detect cruise or other missiles. The elevated platforms are typically provided as inflatables which are tied to the ground via a tether. One such type of inflatable is referred to as an aerostat. A sensor is typically coupled to the airship via a structure which rotates in the azimuth plane to thus provide sensor coverage over a wide area in the azimuth plane.

The so elevated sensor detects and tracks targets and in some cases attempts to perform some early classification to identify potential cruise or other missiles. The sensor transmits data to a ground based theater tactical operation center (TOC) which assigns an aerostat based precision track and illuminate radar to track the missile. The sensor performs precision track on potential cruise missiles and also performs additional classification, discrimination and identification (CDI) tasks.

This precision track data is relayed from the aerostat sensor to a surface-to-air missile (SAM) system which includes a missile system radar. In response to a SAM system missile launch, uplink data is supplied to the missile by the missile system radar. The sensor target track data continues to be supplied to the missile system until the missile intercepts the target.

If the missile includes an on board transmitter (i.e. the missile includes an active seeker system) the missile will then obtain independently radar lock on the incoming cruise missile and home on it. If the missile does not include an on board transmitter (i.e. the missile includes a passive seeker system) then the missile is provided terminal illumination by the sensor and the missile detects portions of the sensor signal reflected off the target to home in on the target. Although this approach is relatively inexpensive compared with the SAM system approach, conventional sensor systems used in existing aerostats do not have the required sensitivity to detect cruise missiles at long range.

To provide an aerostat based sensor with the sensitivity to detect cruise missiles at long range, the sensor must have an antenna capable of long range detection. To provide such an antenna using conventional antenna systems would require the sensor to include three or four separate active array antenna apertures. Each of such antenna apertures would require their own set of transmit/receive (TR) modules. In addition, with conventional TR module spacing, many TR modules would be required to fill the antenna aperture. For example, a conventional antenna having an aperture of approximately 4 square meters ($m^2$) would require over 10,000 TR modules. Such an antenna would have electronic scan capability in both azimuth and elevation planes of approximately ±53°. The size and weight of such an antenna system makes deployment of such a system in an aerostat or other inflatable relatively difficult since the size, weight and power consumption requirements of such a system are incompatible with the limited ability of present technology aerostats.

It would, therefore, be desirable to provide a radar system which can perform a precision track and illumination function and which has size, weight and power consumption characteristics which allow deployment of the system in an aerostat or other elevated platform.

BRIEF SUMMARY OF THE INVENTION

In accordance with the present invention, an array antenna includes two different types of super elements each having transmit/receive (TR) modules coupled thereto. The TR modules are widely spaced and the super elements are arranged such that by selectively activating certain ones of the super elements the antenna provides a dual field of view in elevation. With this particular arrangement, size of the antenna a can be maximized for a given number of TR modules. In one particular embodiment, the antenna includes two superelements (13:1 and 7:1) and an antenna aperture size of 4 square meters ($m^2$) is achieved with 1,440 TR modules. This represents a reduction by nearly a factor of eight over conventional approaches. With the 13:1 and 7:1 super elements, a Narrow Field of View (NFOV) is achieved by activating all super elements in the antenna aperture. This mode of operation provides a ±40° elevation scan for the long to medium range low altitude targets. A Wide Field of View (WFOV) utilizes only the 7 to 1 super elements which are arranged in a center portion of the antenna aperture. This mode of operation provides a ±7.5° elevation scan for relatively high altitude short range targets. WFOV is achieved by using fewer super elements, less antenna gain is achieved. Thus, WFOV operation is appropriate for low elevation, short range target detection mode. The antenna may also optionally include an electronically steerable rear reference antenna that utilizes a small portion of the array antenna and eliminates the need for a separate antenna.

An antenna having a dual limited field of view (FOV) as provided in accordance with the present invention provides a weight efficient approach for incorporating active radar apertures into airborne platforms such as aerostats for look down ADSAM applications. The dual-FOV antenna allows the area gain to be matched to the elevation versus range requirements of the system. The WFOV is used for close in targets while the NFOV is reserved for distant targets. The area gain of the antenna changes between WFOV and NFOV operation since more radiating elements are used in the NFOV mode than are used in the WFOV mode.

Since the targets to be tracked are travelling at a relatively low altitude, it is possible to reduce the need for the range of radar coverage without a concomitant reduction in the ability of the radar system to detect incoming cruise or other missiles. With this arrangement, a radar system which is relatively lightweight and which provides radar coverage for about 360° in azimuth and about 15° in elevation is provided

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before describing the system of the present invention, it should be noted that reference is sometimes made herein to an array antenna having a particular array size and shape (i.e. a particular number of antenna elements or tiles). An example of an array shape is planar, and an example of an array size is 4.0 $m^2$. One of ordinary skill in the art will appreciate of course that the techniques described herein are applicable to various sizes and shapes of array antennas. It should thus be noted that although the description provided herein below describes the inventive concepts in the context of a planar array antenna, those of ordinary skill in the art will appreciate that the concepts equally apply to other sizes and shapes of array antennas including, but not limited to, arbitrary shaped planar array antennas as well as cylindrical, conical, spherical and arbitrary shaped conformal array antennas.

Reference is also sometimes made herein to the array antenna including a radiating element of a particular type, size and shape. For example one type of radiating element is a so-called patch antenna element having a square shape and a size compatible with operation at a particular frequency (e.g. 10 GHz). Those of ordinary skill in the art will recognize, of course that other shapes and types of antenna elements may also be used and that the size of one or more a radiating elements may be selected for operation at any frequency in the RF frequency range (e.g. any frequency in the range of about 1 GHz to about 100 GHz). The types of radiating elements which may be used in the antenna of the present invention include but is not limited to notch elements, dipoles, slots or any other radiating element well known to those of ordinary skill in the art.

Also, reference is sometimes made herein to generation of an antenna beam having a particular shape or beamwidth. Those of ordinary skill in the art will appreciate, of course, that antenna beams having other shapes and widths may also be used and may be provided using well-known techniques such as by inclusion of amplitude and phase adjustment circuits into appropriate locations in an antenna feed circuit, for example.

Figure 1:
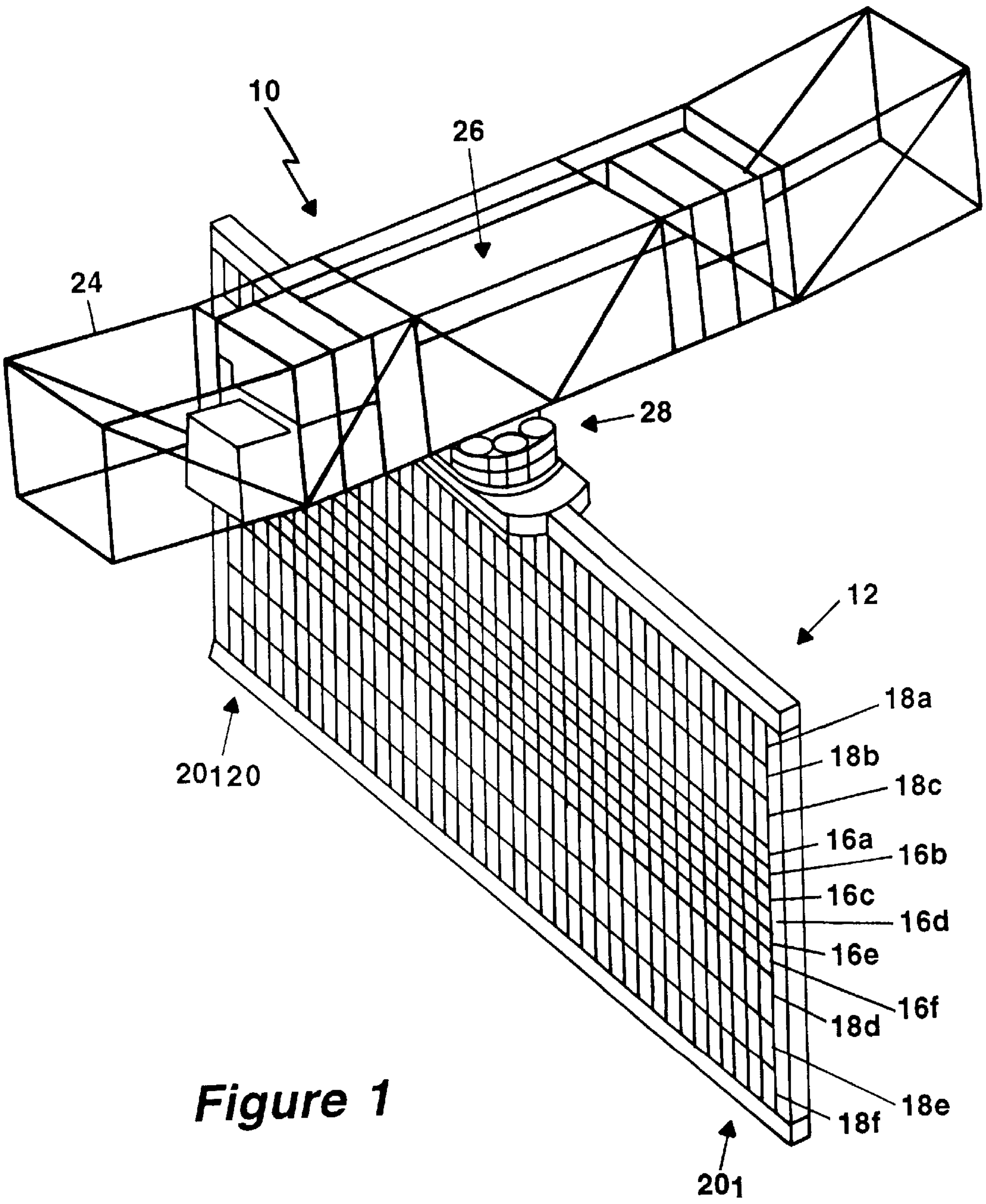
FIG. 1 is an isometric view of an antenna having a dual field of view in elevation.

Referring now to FIG. 1, a radar system 10 includes an array antenna 12 having a dual field of view in elevation. The array antenna 12 is provided from a plurality of super elements which will be described in detail below in conjunction with FIGS. 2 and 3. Suffice it here to say that the array antenna 12 includes six rows 16*a*–16*f* of seven-to-one super elements here arranged in a central portion of the array antenna 12. Array antenna 12 also includes six rows 18*a*–18*f* of thirteen-to-one super elements here arranged with three rows 18*a*–18*c* above the six rows of seven-to-one super elements and three rows 18*d*–18*f* below the six rows of seven-to-one super elements. Thus, in elevation, the array antenna 12 includes a total of twelve array rows while in azimuth, the array antenna 12 includes 120 columns $\mathbf{20}_1$–$\mathbf{20}_{120}$.

The antenna operates in two modes. The first mode is referred to as narrow field-of-view (NFOV) mode and the second mode is referred to as wide field-of-view (WFOV) mode. For operation in the NFOV mode, the total aperture of the array antenna 12 is utilized in that each of the super elements in each of the rows 16*a*–16*f* and 18*a*–18*f* of the array antenna is activated. In the NFOV mode of operation, the array antenna 12 is capable of an elevation electronic scan at ±4° which provides a two-way scan loss at 5.5 dB (at the scan limit). In the WFOV mode only the seven-to-one super elements in rows 16*a*–16*f* are energized thus increasing the elevation scan limit is to ±7.5°. Thus the WFOV mode of operation is used to detect and track lower elevation targets while the NFOV mode is typically used to detect and track long range targets.

Since the array antenna utilizes fewer antenna elements in WFOV mode than NFOV mode, the array antenna has gain characteristic which is lower in the WFOV mode than in the NFOV mode (i.e. the area gain of the antenna changes between WFOV and NFOV operation since more radiating elements are used in the NFOV mode than are used in the WFOV mode). Although a lower antenna gain results when switching from the NFOV to the WFOV mode, as mentioned above, the WFOV mode is selected for detection of lower elevation targets which are closer in range than the targets detected in NFOV mode. Thus the lower gain characteristic in WFOV mode has no adverse impact on overall system performance.

Use of the super element and dual field of view approaches allows the number of TR modules required in the array antenna 12 to be greatly reduced from the number of TR modules which would otherwise be required if a conventional antenna were used. With the present invention, the TR modules are spaced by approximately 0.55λ which allows the array antenna to scan from broadside to about ±53° in azimuth.

By reducing the number of TR modules the antenna is made relatively lightweight. At the same time, the dual FOV approach allows the area gain to be matched to the elevation versus range requirements of the corresponding radar system with which the array antenna will be used. By maintaining the requisite scan capability while reducing the weight of the array antenna, a weight efficient approach for incorporating active radar apertures into airborne platforms such as aerostats for look down ADSAM applications is provided.

The array antenna 12 is here shown attached to truss 24 which is sewn into the fabric of an aerostat in a manner which is known to thus allow the array antenna 12 to be elevated. Disposed in the truss 24 are electronics and other apparatus 26 for operating the array antenna and other portions of the system 10. A conventional azimuth drive mechanism 28 allows array antenna 12 to be rotated in the azimuth direction to allow coverage of 360° in azimuth. In an alternate embodiment, two such array antennas 12 may be arranged or stacked one over the other such that the active faces of each antenna are orthogonally disposed.

In one embodiment and as will be described below in conjunction with FIG. 4, array antenna 12 can be provided such that each opposing surface of the array antenna 12 includes super elements which are coupled to a single set of TR modules. The single set of TR modules powers both the super elements on each of the opposing surfaces which form antenna apertures. By using the two face and stacking schemes, it would be possible to provide 360° coverage in azimuth without the need to mechanically rotate the array antenna 12.

Figure 2:
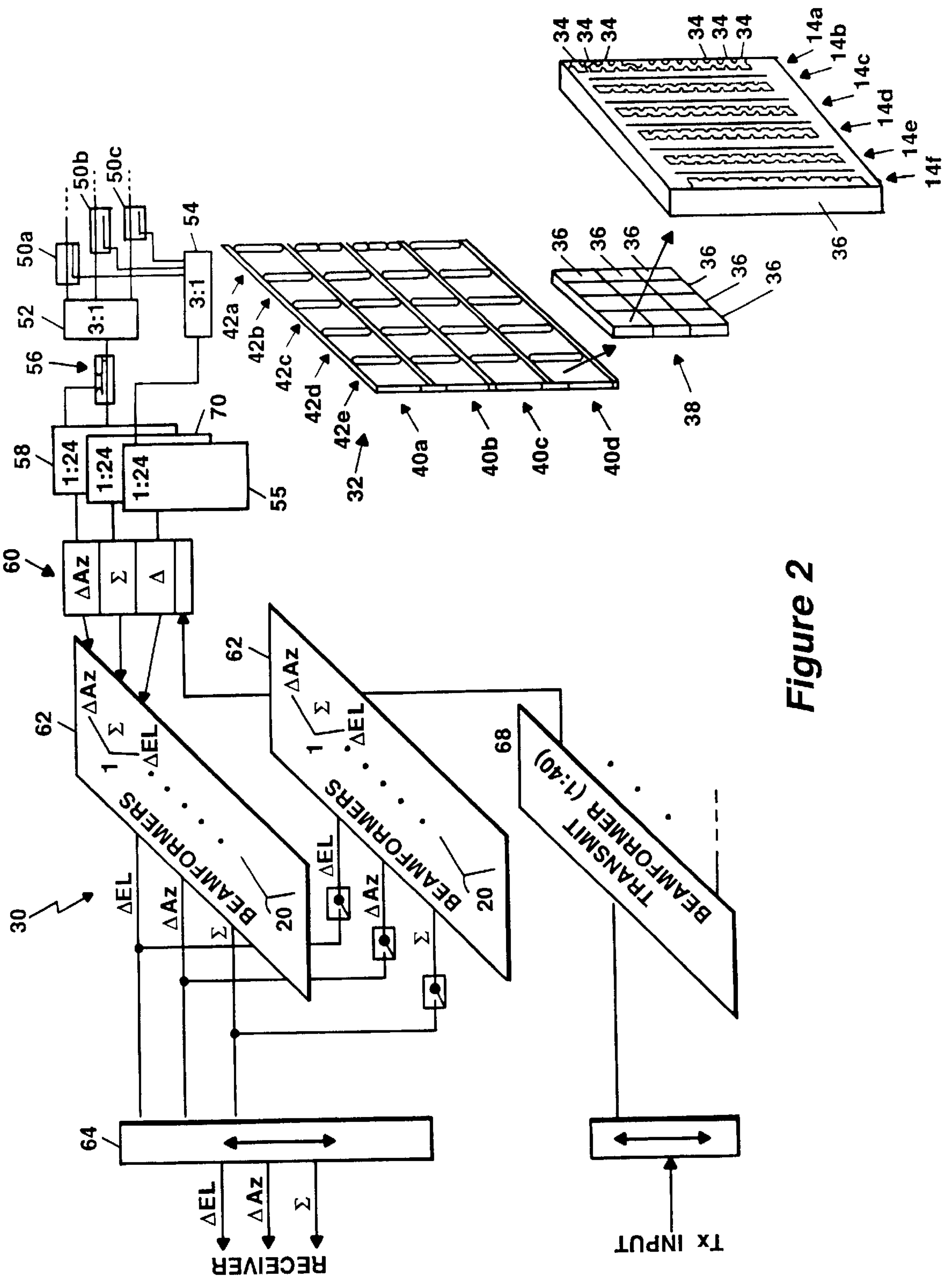
FIG. 2 is a block diagram of an antenna system having a dual field of view in elevation.

Referring now to FIG. 2, an active array antenna 30 which may be similar to array antenna 12 described above in conjunction with FIG. 1, includes an aperture 32 of radiating elements generally denoted 34. The radiating elements are coupled in columns to provide a plurality of super elements 14*a*–14*f* generally denoted 14. In this example six super elements are shown but fewer or greater than six could be used depending upon the particular application. The super elements 14 are grouped to provide a tile 36 and the tiles 36 are likewise grouped to provide a subarray 38. Each of the subarrays 38 thus includes a plurality of antenna tiles 36.

In the embodiment shown in FIG. 2, the antenna aperture 32 is provided having four rows 40*a*–40*d* of subarrays 38 and five columns 42*a*–42*e* of subarrays 38. Thus, the array aperture 32 is provided as a four by five (4×5) array of subarrays 38.

Each of the tile subarrays 38 is formed from a four-by-three (4×3) array of tiles 36. Thus, each tile subarray 38 includes twelve tiles 26, and the antenna aperture 32 includes 20 such subarrays 38 for a total of two-hundred and forty tiles 36 in the antenna aperture 32.

To provide the antenna 30 with capability of operating in the WFOV and NFOV modes, the array aperture 32 is divided into 20 subarrays 38 of two types. In each type of subarray 38, the twelve tiles 36 are arranged as four tiles in width by three tiles in height (4×3). Thus, for each subarray 38, there are three tiles in elevation regardless of the field of view.

To achieve wide filed of view (WFOV) operation, each of the subarrays 38 in the two center rows 40*b*, 40*c* is populated with twelve tiles 36, each including six superelements 14*a*–14*f* arranged in columns. Each superelement 14 in the rows 40*b*, 40*c* includes seven radiating elements 34. The radiating elements may, for example, be provided as patch radiators. When operating in the WFOV mode, only those elements in rows 40*b* and 40*c* are energized.

For the narrow field-of-view (NFOV), the two outermost rows 40*a*, 40*d* of subarrays 38 also include twelve tiles 36, each of the tiles 36 including six columns of superelements 14*a*–14*f*, and each of the superelements 14 including thirteen radiating elements 32. When operating in the NFOV mode, all of the elements in rows 40*a*–40*d* are energized.

In one embodiment, each of the tiles 36 is provided as a relatively lightweight multilayer tile including stacked patch tile radiators 32, RF interconnects, beamformers, and multilayer RF, power, and control logic printed wiring boards.

The superelements 14 in each tiles 36 are combined in the tile layers to form a single output for the respective ones of the 7:1 and 13:1 superelements 14. Thus, in this case where each tile 36 includes six super elements 14, each tile has six input/output ports.

Power is provided to or received from the combined superelements 14 via a series of couplers 50*a*–50*c* generally denoted 50. In one embodiment, when fed via the through (i.e. non-coupled) path of each of the couplers 50 the super elements 14 are provided having uniform illumination in elevation.

The coupled paths of couplers 50 provide a weighted Bayliss/Taylor (or other appropriately selected amplitude) distribution across the aperture 32. Each of the three coupled elevation samples from couplers 50 is combined in a three-way combiner 54 to form the subarray delta elevation (Δ El) signal contribution. Twenty-four such signal contributions from each of the columns in the subarray are combined in a 1:24 combiner 55 to contribute to the Δ El signal.

The azimuth delta (Δ Az) signal is coupled via coupler 56 with Bayliss/Taylor distribution (or other appropriately selected amplitude distribution) prior to the 1:3 power divider 52. Divider 52 delivers uniform illumination to the array elements in transmit elevation. Twenty-four such signals are combined in a 1:24 power divider 58 for each subarray to form the subarray Δ Az signal. The sum and two Δ signals are processed by a subarray module 60. The sub array module 60 includes time delay units and amplitude adjustment circuits and provides an output signal to respective ones of a plurality of array beamformers 62. In this particular embodiment the beamformers are shown as 3:20 combiners for WFOV and NFOV. The signals are fed from the respective beamformer circuits 62 to a receiver 64 where the sum and delta signals are subjected to further signal processing techniques.

In transmit mode of operation, power is distributed equally to each of the radiators in the array in the following manner. A transmitter 66 provides a transmit signal to a single 1:20 beamformer 68. The transmit signal is fed through subarray module 60 to a transmit power splitter 70 and subsequently to the straight through path of the coupler 56.

The output of coupler 56 is fed to the power divider 52 which provides equal power signals to couplers 50*a*–50*c* which in turn provide uniform illumination that is distributed to each of the forty subarrays 38 in the transmit mode of operation. Thus, in transmit mode, twenty-four columns in elevation per subarray can be fed with uniform illumination. It should be noted, however, that in both receive and transmit modes, any desired illumination known to those of ordinary skill can be used.

Figure 3:
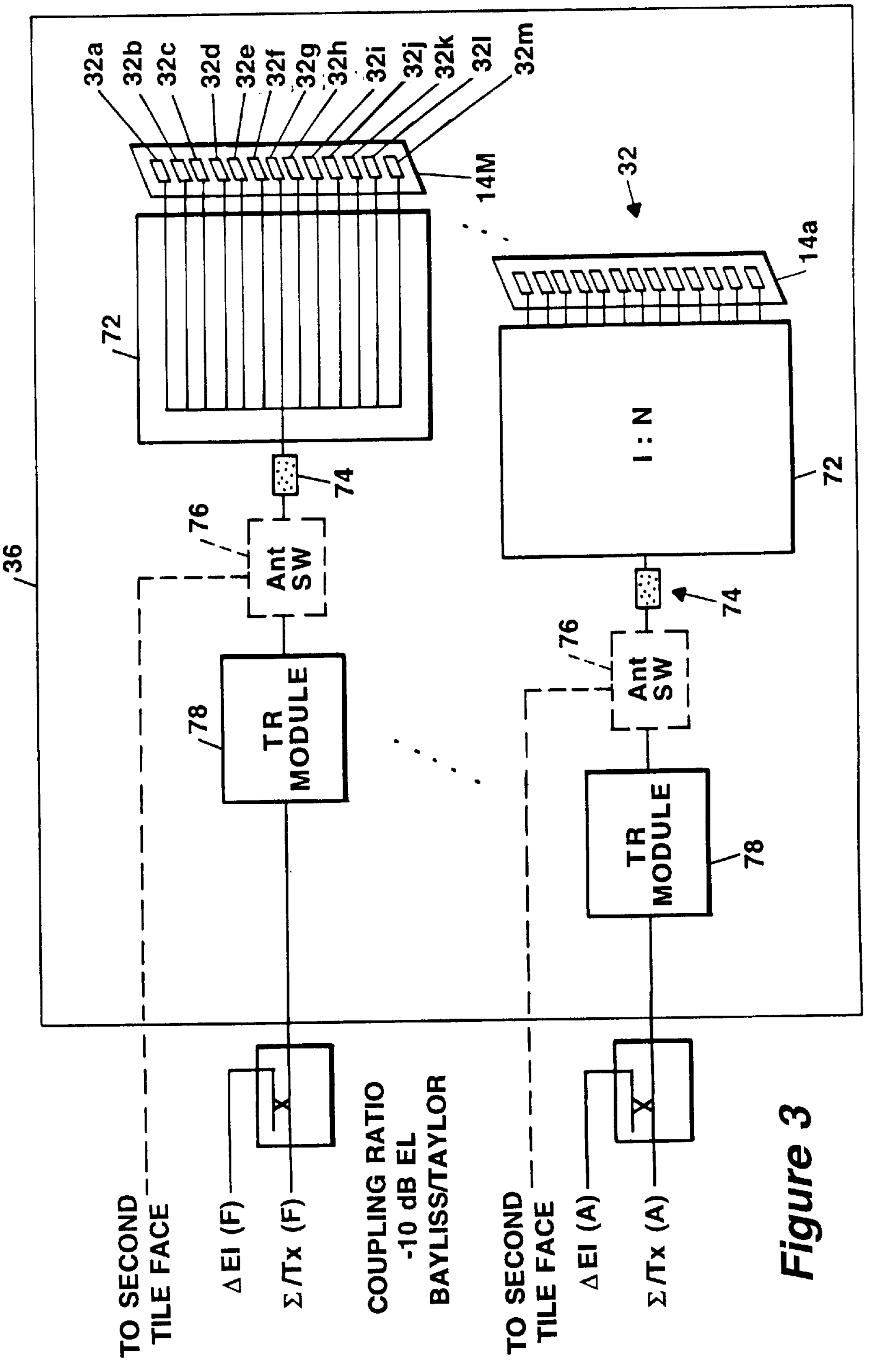
FIG. 3 is a block diagram of an antenna tile including a plurality of antenna superelements.

Referring now to FIG. 3, a tile 36 includes a plurality of radiating elements 32*a*–32N generally denoted 32 arranged as super element columns 14*a*–14M. In this particular example M=6 and for WFOV tiles N=7 and for NFOV tiles N=13. Those of ordinary skill in the art will appreciate of course that other values of M and N may also be used. Each of the radiating elements 32 is coupled to a port of a signal combiner 72. In this particular example, each column includes 13 radiating elements and thus combiners 72 include thirteen ports coupled to respective ones of the radiating elements 32. In one embodiment, with tile 36 provided as a relatively lightweight multilayer tile including stacked patch tile radiators 32 and an operating frequency of about 10 GHz, a WFOV tile measures 3.756" in width by 4.487" in height and each of the NFOV tiles measures 3.756" in width and 8.333" in height.

A feed/output port of the combiner 72 is coupled to a first port of a subarray row dependent delay unit 74. A second port of the delay unit 74 is coupled to a first port of an optional antenna switch 76. A second port of the antenna switch 76 is coupled to a first port of a TR module 78. A second port of the TR module 78 corresponds to an input/output port of the tile 36. With this approach, each super element 14 includes only one TR module 78. Thus, in the array antenna 12 of FIG. 1, for example, only twelve TR modules 78 are required for each vertical column $\mathbf{20}_1$–$\mathbf{20}_{40}$.

In the case where the radiating elements 32 are provided as patch radiators, the 13:1 column combiners can be fabricated as an integral part into the multilayer sandwich upon which the radiating elements 32 reside.

In some embodiments it may be desirable to provide radiating elements 32 on two opposing surfaces of the tile 36. In this case, the tile is provided having two radiating apertures. The switch 76 can be used to couple the TR modules to either of the radiating apertures.

In a preferred embodiment, the switch 76 is provided external to the TR modules 78 but in some applications it may be desirable, necessary or advantageous that the switch be internal to the TR module 78. In any event, the switch 76 should be capable of handling relatively high power signals and have a relatively low insertion loss characteristic.

The angle of the elevation beam can be tilted downward by mechanically tilting the aperture 32 or by electronically steering the beam. To mechanically tilt the aperture 32, a wedge or other structure can be disposed between the antenna face and the supporting structure or in the case where the aperture includes two such opposing apertures, between the two apertures. To electronically steer the beam downward, a phase shifter is included within the TR module 78.

Figure 4:
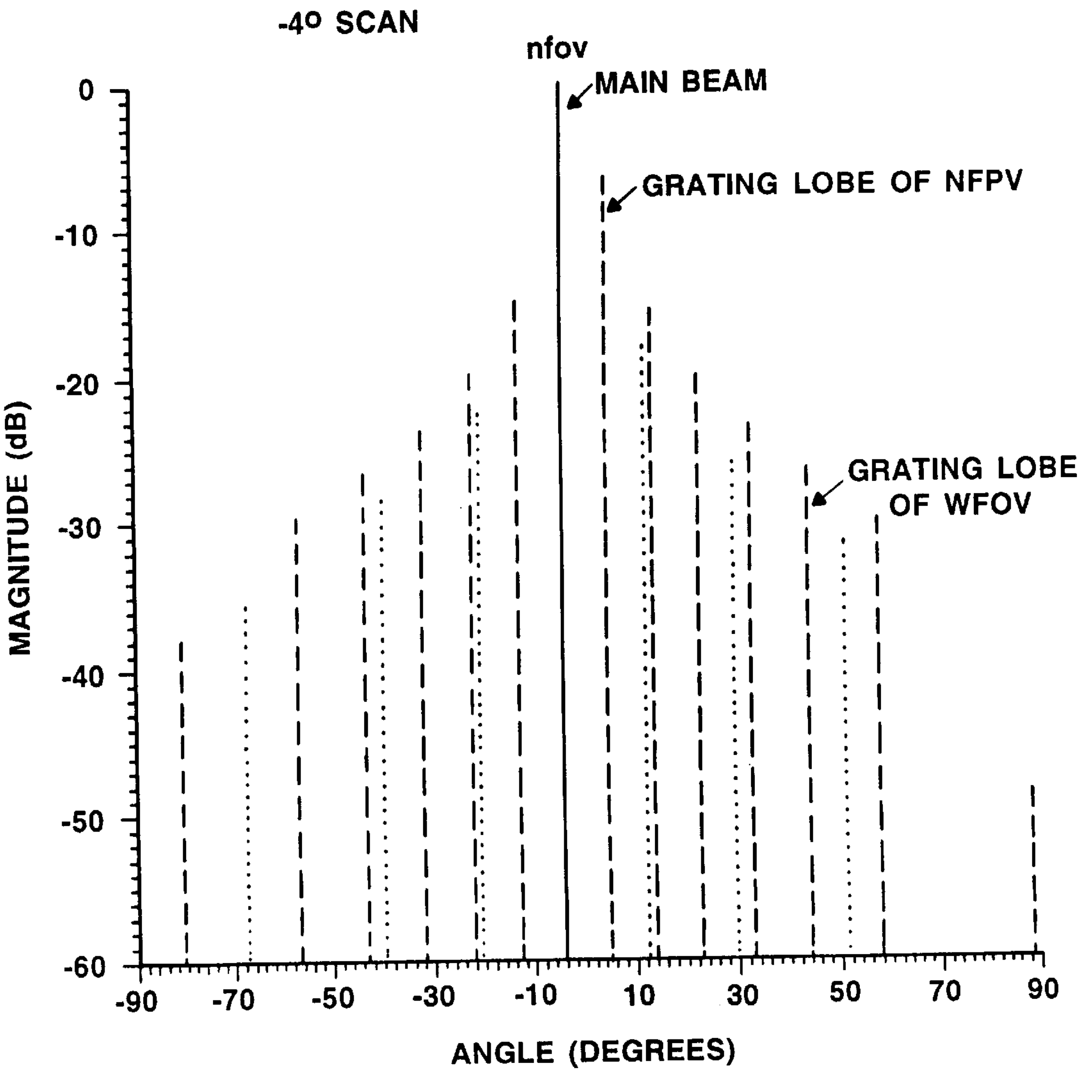
FIG. 4, is a plot of the elevation grating lobes at maximum scan (−4°) of the NFOV antenna.

Referring now to FIG. 4, one of the by products of spacing the T/R modules more widely in elevation (7 to 1 and 13 to 1) are elevation grating lobes and FIG. 4 depicts an example of elevation grating lobes at maximum scan (−4°) of the NFOV antenna. It should be noted that the grating lobes are the product of the array factor grating lobes and the super element(s) elevation pattern centered at 0°. Several observations are noted from the figure. First, the grating lobes are lower in the direction of the scan. Since, in the present application, the area of interest is down (e.g. scanning for low altitude missiles such as cruise missiles), the higher grating lobes above the main beam do not impact system performance. Second the grating lobes are a mixture of those contributed by 13 to 1 and 7 to 1 super elements. Third, the grating lobes are confmed to the elevation principal plane only. Fourth, the additional clutter returns contributed by the lower grating lobes is negligible since the two-way pattern is utilized in clutter calculations and the highest one-way level is 15 dB down (30 dB two-way). Thus, by tolerating some residual grating lobes a relatively lightweight and inexpensive antenna can be provided.

Figure 5:
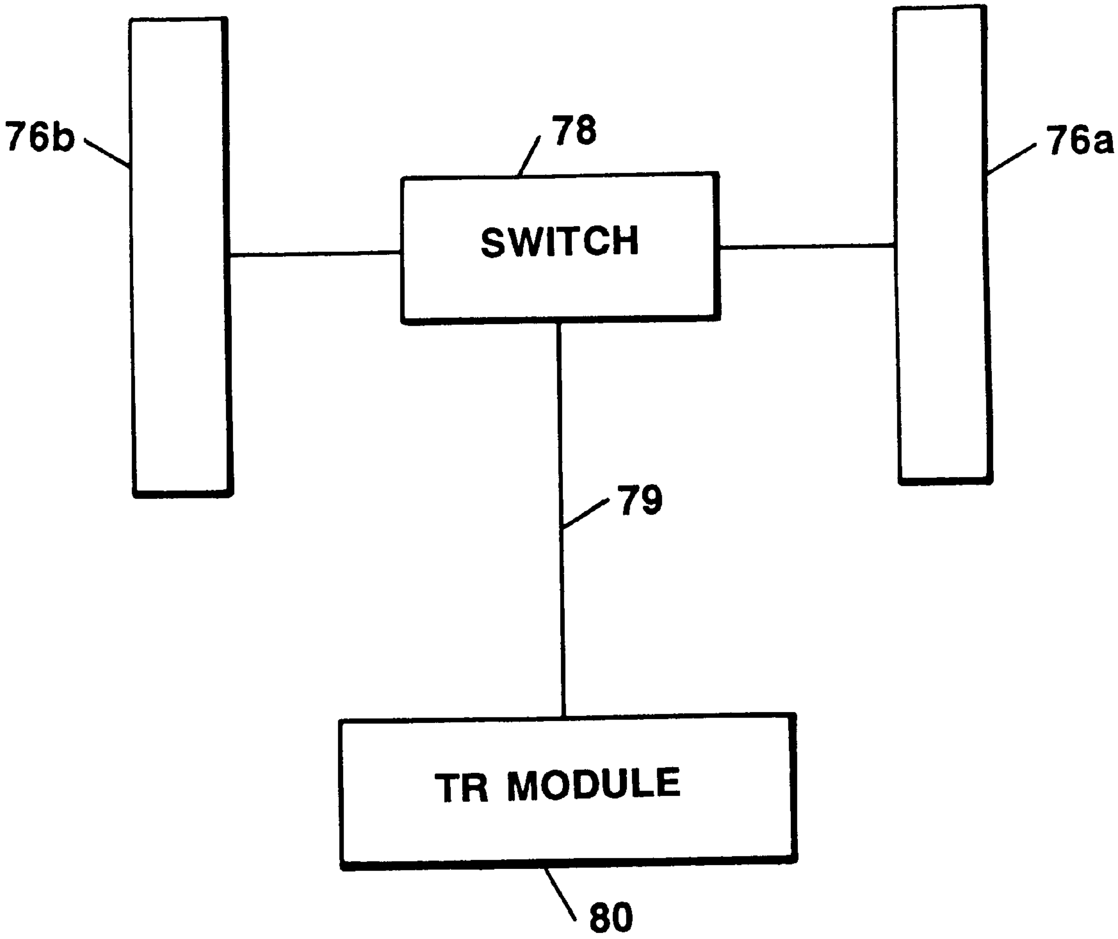
FIG. 5 is block diagram of an antenna tile having two opposing antenna apertures.

Referring now to FIG. 5, two opposing antenna apertures or faces 76*a*, 76*b* which may be provided on two opposing surfaces of a single tile (such as tile 36 in FIG. 3) are coupled to opposite switch ports of a switch 78. A common arm 79 of the switch 78 is coupled to a port of a TR module 80. With this configuration, the isolation characteristic between the antenna front face 76*a* and back face 76*b* is preferably not less than 60 dB. To achieve such an isolation characteristic, the isolation requirement in switch 78 must be relatively high. If high isolation switches are not available, however, to increase the isolation between the antenna faces 76*a*, 76*b*, it may be desirable to provide random lengths of transmission lines leading to the radiators in each of the apertures 76*a*, 76*b*. Amplitude and phase offsets introduced into the system via such randomization may be removed by calibrating both front and back antenna faces 76*a*, 76*b* of each array panel or tile.

It should be noted that in some applications, it may be desirable to stack two such array antenna (e.g. one antenna disposed above the other) arranged orthogonally, to thus provide 360 degrees of coverage. Thus, in this case, four antenna faces each having an aperture size of 4 $m^2$ can provide electronic coverage of 360° with only two sets of T/R modules for all four faces resulting in a total of about 2880 TR modules.

It should be noted that using conventional techniques, a radar system having a single face azimuth slewable antenna would require over 10,000 modules for the same aperture size of 4 $m^2$. Such an antenna has an electronic scan capability of ±53° in both azimuth and elevation. Such an array would be too expensive and too heavy for airborne applications.

Figure 6:
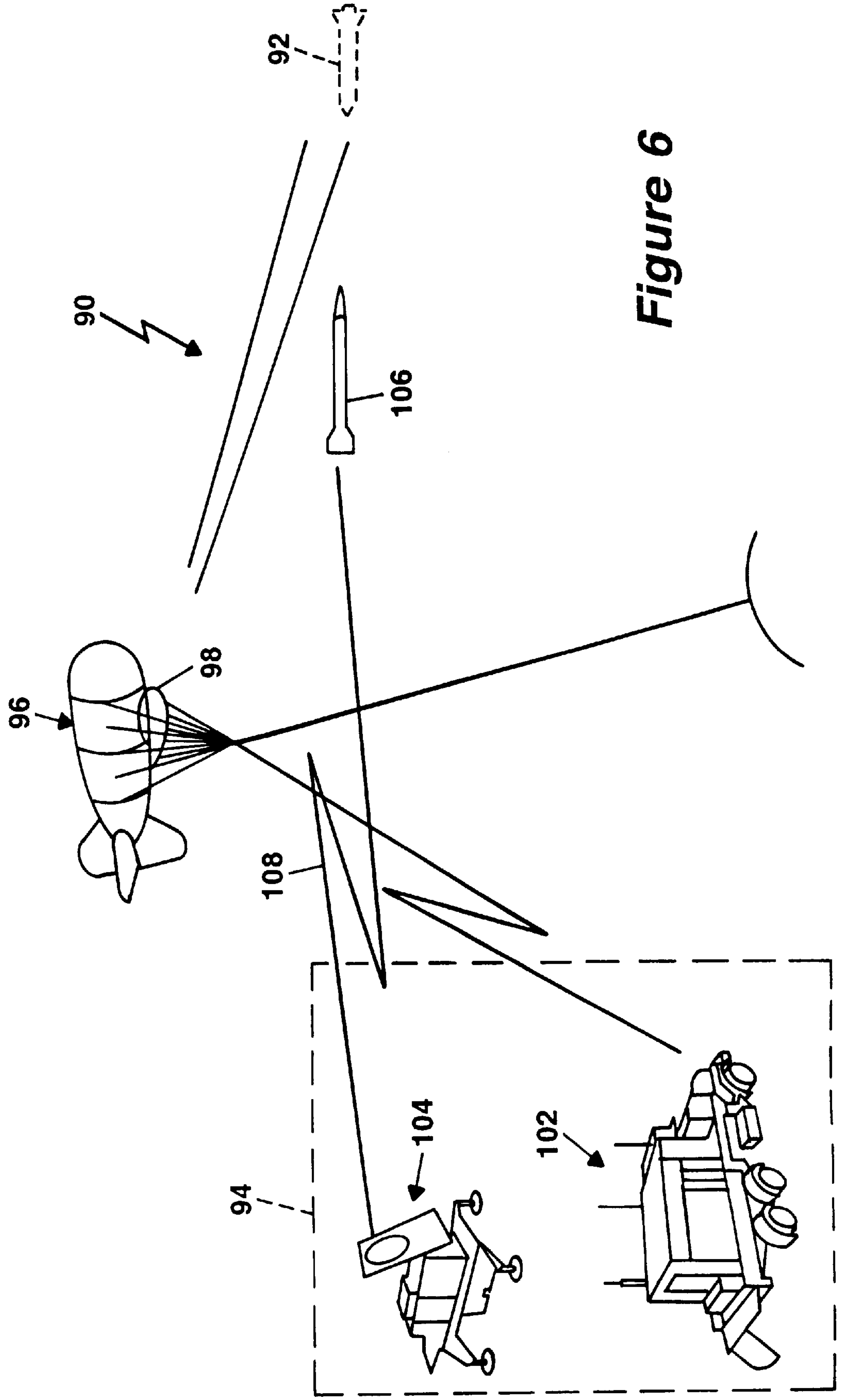
FIG. 6 is a block diagram of an air directed surface-to-air missile system utilizing an antenna having a dual field of view in elevation.

Referring now to FIG. 6, an ADSAM system 90 for tracking cruise and other types of missiles 92 (here shown in phantom since it is not properly a part of the ADSAM system) includes a surface-to-air missile (SAM) system 94, and an inflatable 96 such as an aerostat for example, which includes a sensor system including an antenna of the type described above in conjunction with FIGS. 1–5 which is enclosed behind a radome 98 on a bottom portion of the aerostat 96. In this particular embodiment the antenna is hoisted aloft by the aerostat 96 which is stationed in a fixed position via a tether 100. Those of ordinary skill in the art will appreciate of course that other airships or airborne platforms may also be used. Primary power and data are transmitted over the tether 100 in a manner which is generally known.

The aerostat payload includes, but is not limited to, power conversion equipment, a receiver, an exciter, beemsteering generator, inertial measurement unit (IMU), cooling system and the active array antenna (i.e. the sensor system).

Once a surveillance sensor in another aerostat detects missile 92, the surveillance sensor transmits data to a ground based theater tactical operation center 102 which assigns an aerostat based precision track and illuminate radar (98) to track the missile 92.

This precision track data is relayed from the airship 96 sensor to the surface-to-air missile (SAM) system 94 which includes a missile system radar 104. In response to a launch of a SAM missile 106, uplink data 108 is supplied to the missile by the missile system radar 104. The sensor target track data continues to be supplied from the airship 98 to the missile 106 via the tactical operation center 102 and missile radar 104 and associated uplink 108 until the missile 106 intercepts the target.

With this approach, a system which provides theater-wide surveillance and detection of targets beyond the terrain masked horizon of local surface sensors is provided.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An array antenna comprising:

(a) a first plurality of super elements, each of said first plurality of super elements comprising N radiating elements;

(b) a second plurality of super elements, each of said second plurality of super elements comprising M radiating elements where M is not equal to N;

(c) a beamforming circuit;

(d) a circuit to selectively couple the M and N radiating elements of said first and second plurality of super elements to said beamforming circuit, such that in response to said circuit coupling each of the M and N radiating elements of said first and second plurality of super elements to said beamforming circuit, the antenna is provided having a first field of view and in response to said circuit coupling each of the N radiating elements to said beamforming circuit and isolating each of the M radiating elements from said beamforming, the antenna is provided having a second field of view which is different than the first field of view.

2. The array antenna of claim 1 wherein:

said first plurality of super elements are disposed to provide a first row of the array antenna; and said second plurality of super elements are disposed to provide a second different row of the array antenna.

3. The array antenna of claim 2 wherein:

a first plurality of rows of the array antenna are provided from said first plurality of super elements; and a second plurality of different rows of the array antenna are provided from said second plurality of super elements.

4. The array antenna of claim 3 wherein:

at least some of said first plurality of rows are contiguous; and at least some of said second plurality of rows are contiguous.

5. The array antenna of claim 3 wherein said first and second plurality of rows are like pluralities.

6. The array antenna of claim 5 wherein:

in response to the each of said M and N radiating elements in the array antenna being coupled to said beamforming circuit, the array antenna is provided having a first field of view corresponding to a narrow field of view (NFOV); and in response to only said N radiating elements in the array antenna being coupled to said beamforming circuit, the array antenna is provided having a second field of view corresponding to a wide field of view (WFOV).

7. An antenna comprising:

(a) a first super element including a first predetermined number of radiating elements;

(b) a first combiner circuit having a plurality of radiating element ports with first ones of the plurality of radiating element ports coupled to respective ones of said first predetermined number of radiating elements;

(c) a first TR module having a first port coupled to a feed/output port of said first combiner;

(d) a second super element including a second predetermined number of radiating elements wherein the predetermined number of radiating elements in the first super element is different than the predetermined number of radiating elements in the second super element;

(e) a second combiner circuit having a plurality of radiating element ports with first ones of the plurality of radiating element ports coupled to respective ones of said second predetermined number of radiating elements; and (f) a second TR module having a first port coupled to a feed/output port of said second combiner.

8. The antenna of claim 7 wherein:

said first super element is a first one of a plurality of like first super elements;

said first combiner circuit is a first one of a plurality of like first combiner circuits, each of said plurality of first combiner circuits having a plurality of radiating element ports with first ones of the plurality of radiating element ports coupled to respective ones of said first predetermined number of radiating elements in said plurality of like first super elements;

said first TR module is a first one of a like plurality of TR modules, each of said plurality of TR modules having a first port coupled to a feed/output port of respective ones of said plurality of first combiner circuits;

said second super element is a first one of a plurality of like second super elements;

said second combiner circuit is a first one of a plurality of like second combiner circuits, each of said plurality of second combiner circuits having a plurality of radiating element ports with first ones of the plurality of radiating element ports coupled to respective ones of said second predetermined number of radiating elements in said plurality of like second super elements; and said second TR module is a first one of a like plurality of second TR modules, each of said plurality of second TR modules having a first port coupled to a feed/output port of respective ones of said plurality of second combiner circuits.

9. The antenna of claim 8 further comprising at least one beamforming circuit; and means for selectively coupling first ones of said first plurality of TR modules and first ones of said second plurality of TR modules to at least one of each of said at least one beamforming circuit to provide the antenna having a selected one of a plurality of different fields of view.

10. The antenna of claim 8 wherein said TR modules are spaced apart by a relatively wide distance in an elevation direction.

11. The antenna of claim 10 wherein in response to the each of said first and second plurality of super elements in the antenna being coupled to said beamforming circuit, the antenna is provided having a first field of view corresponding to a narrow field of view (NFOV).

12. The array antenna of claim 10 wherein in response to only said second plurality of super elements in the array antenna being coupled to said beamforming circuit, the array antenna is provided having a second field of view corresponding to a wide field of view (WFOV).

13. The antenna of claim 10 wherein said plurality of like first super elements are disposed in a central portion of the antenna.

14. The antenna of claim 13 wherein said plurality of like second super elements are disposed about the central portion of the antenna.

15. An antenna comprising:

(a) a plurality of first super elements, each of said first super elements including a first number of radiating elements, said plurality of first super elements arranged to provide a row of the antenna;

(b) a plurality of second super elements, each of said plurality of second super elements including a second different number of radiating elements with first ones of said plurality of second super elements disposed as a first antenna row above the row of said plurality of first super elements and second ones of said plurality of second super elements disposed as a first antenna row below the row of said first super elements;

(c) a beamforming circuit;

(d) a circuit to selectively couple said first super elements to said beamforming circuit to provide the antenna having a first field of view and to selectively couple said second super elements to said beamforming circuit to provide the antenna having a second different field of view.

16. The array antenna of claim 15 wherein:

said row of first super elements is a first row of a plurality of rows of first super elements, each of said plurality of rows of first super elements;

said row second super elements disposed as a first antenna row above the first row of said first super elements is a first row of a plurality of rows of second super elements disposed above said first row of first super elements; and said row second super elements disposed as a first antenna row below the first row of said first super elements is a first row of a plurality of rows of second super elements disposed below said first row of first super elements.

17. The array antenna of claim 16 wherein:

said plurality of rows of first super elements are contiguous;

said plurality of rows of second super elements disposed above said first row of first super elements are contiguous and one row of said plurality of rows of second super elements disposed above said first row of first super elements is adjacent one row of said plurality of contiguous rows of first super elements; and said plurality of rows of second super elements disposed below said first row of first super elements are contiguous and one row of said plurality of rows of second super elements disposed below said first row of first super elements is adjacent one row of said plurality of contiguous rows of first super elements.

18. The array antenna of claim 17 wherein said plurality of contiguous rows of first super elements are disposed in central portion of the antenna.

19. The array antenna of claim 18 wherein the number of rows of second super elements disposed above said first row of first super elements equals the number of rows of second super elements disposed below said first row of first super elements.

* * * * *